(12) United States Patent
Bestermann

(10) Patent No.: US 8,412,942 B2
(45) Date of Patent: Apr. 2, 2013

(54) METHOD AND SYSTEM FOR SEAMLESS SSID CREATION, AUTHENTICATION AND ENCRYPTION

(75) Inventor: John Bestermann, Suwanee, GA (US)

(73) Assignee: ARRIS Group, Inc., Suwanee, GA (US)

( * ) Notice: Subject to any disclaimer, the term of this patent is extended or adjusted under 35 U.S.C. 154(b) by 1122 days.

(21) Appl. No.: 12/018,033

(22) Filed: Jan. 22, 2008

(65) Prior Publication Data
US 2008/0175386 A1  Jul. 24, 2008

Related U.S. Application Data

(60) Provisional application No. 60/881,727, filed on Jan. 22, 2007.

(51) Int. Cl.
H04L 9/32 (2006.01)
H04L 29/06 (2006.01)
H04L 9/08 (2006.01)
H04L 9/00 (2006.01)
H04K 1/00 (2006.01)

(52) U.S. Cl. .......... 713/170; 713/153; 713/168; 380/44; 380/247; 380/249; 380/270; 726/2; 726/5; 455/435.1; 455/466; 370/328; 370/338; 370/352

(58) Field of Classification Search .......... 380/44, 380/247, 249, 270; 713/153, 170, 168; 726/5, 726/2; 370/328, 338, 352; 455/435, 435.1, 455/466
See application file for complete search history.

(56) References Cited

U.S. PATENT DOCUMENTS

| | | | | |
|---|---|---|---|---|
| 6,782,260 | B2* | 8/2004 | Nakakita et al. | 455/435.1 |
| 7,317,715 | B2* | 1/2008 | Wang | 370/352 |
| 7,448,068 | B2* | 11/2008 | Sun et al. | 726/2 |
| 2003/0134638 | A1* | 7/2003 | Sundar et al. | 455/435 |
| 2006/0056634 | A1* | 3/2006 | Lee et al. | 380/270 |
| 2006/0153122 | A1* | 7/2006 | Hinman et al. | 370/328 |
| 2006/0177063 | A1* | 8/2006 | Conway et al. | 380/270 |
| 2006/0193300 | A1* | 8/2006 | Rawat et al. | 370/338 |
| 2007/0060043 | A1* | 3/2007 | Qi et al. | 455/3.02 |
| 2007/0157024 | A1* | 7/2007 | Miller | 713/168 |
| 2008/0171561 | A1* | 7/2008 | Irony et al. | 455/466 |

* cited by examiner

Primary Examiner — Edan Orgad
Assistant Examiner — Kari Schmidt
(74) Attorney, Agent, or Firm — Troy A. Van Aacken; Robert J. Starr

(57) ABSTRACT

Using an identifier generation algorithm, a device coupled to a communication network generates an SSID and associated encryption key for a mobile device using its unique identifier. The encryption key and SSID are stored to a configuration database server coupled to the network. A wireless-capable device that provides access to the network receives the SSID and encryption key from the configuration database and sends a broadcast message that includes the SSID and unencrypted original information. The mobile user device receives the broadcast message when it enters the presence of the wireless access device. Using the identifier generation algorithm the mobile device generates an SSID and key from its unique identifier and encrypts the original information and sends a return message including the SSID and the encrypted original information. The mobile device is granted access if unencrypted original information from the return message matches that sent in the broadcast message.

8 Claims, 2 Drawing Sheets

METHOD AND SYSTEM FOR SEAMLESS SSID CREATION, AUTHENTICATION AND ENCRYPTION

CROSS REFERENCE TO RELATED APPLICATION

This application claims priority under 35 U.S.C. 119(e) to the benefit of the filing date of Bestermann, U.S. provisional patent application Ser. No. 60/881,727 entitled "Method and system for seamless SSID creation, authentication and encryption," which was filed Jan. 22, 2007, and is incorporated herein by reference.

FIELD OF THE INVENTION

This invention relates, generally, to communication devices and, more particularly to the provisioning of wireless device for use in a wireless local area network that is coupled to a fixed broadband network.

BACKGROUND

As more and more subscribers of cellular telephony services forgo using traditional telephony service, sometime referred to as a 'land line', they are relying solely on their cellular devices at home and workplace. These users typically subscribe to broadband services from a telephony operator (often the provider of the land line services that they may forgo). A wireless access point coupled to the broadband communication network (Digital Subscriber Line ("DSL") or Hybrid Fiber Coaxial Cable ("HFC")) that delivers the broadband services can be configured so that when a cellular, or other mobile device, comes within the presence of the access point's wireless signal communication to and from the mobile device is transported through the access point and over the broadband network, rather than over a cellular or similar wireless network. Examples of a wireless access point include a DSL modem or a cable modem with wireless (e.g., Wi-Fi) capabilities.

A subscriber configures the wireless access point to the broadband network by providing a network identifier, such as a service set identifier ("SSID") and a corresponding authentication key that is unique to the mobile device and typically based on a unique identifier embedded in the mobile device. A user typically enters the unique identifier of the mobile device into an interface, for example a software user interface on a PC that is coupled to the wireless access point device, and the software generates the network identifier and the key. The access device then transmits values representing the network identifier and the corresponding key to the mobile device so that when the mobile device attempts to access the broadband network through the access point, the access point can authenticate the mobile device via the network identifier and information encrypted by and received from the mobile device.

While this method and system is functional and seems to work well, the initial configuring of the network identifier and the corresponding key can be cumbersome, since a mobile devices unique identifier may comprise many alphanumeric characters. In addition, for many users who are not comfortable setting up technology devices, the process can be daunting and lead to frustration.

Thus, there is a need in the art for a method and system for automatically performing an initial configuration of a mobile subscriber device for use with a wireless access point coupled to a broadband, or similar, communication network.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
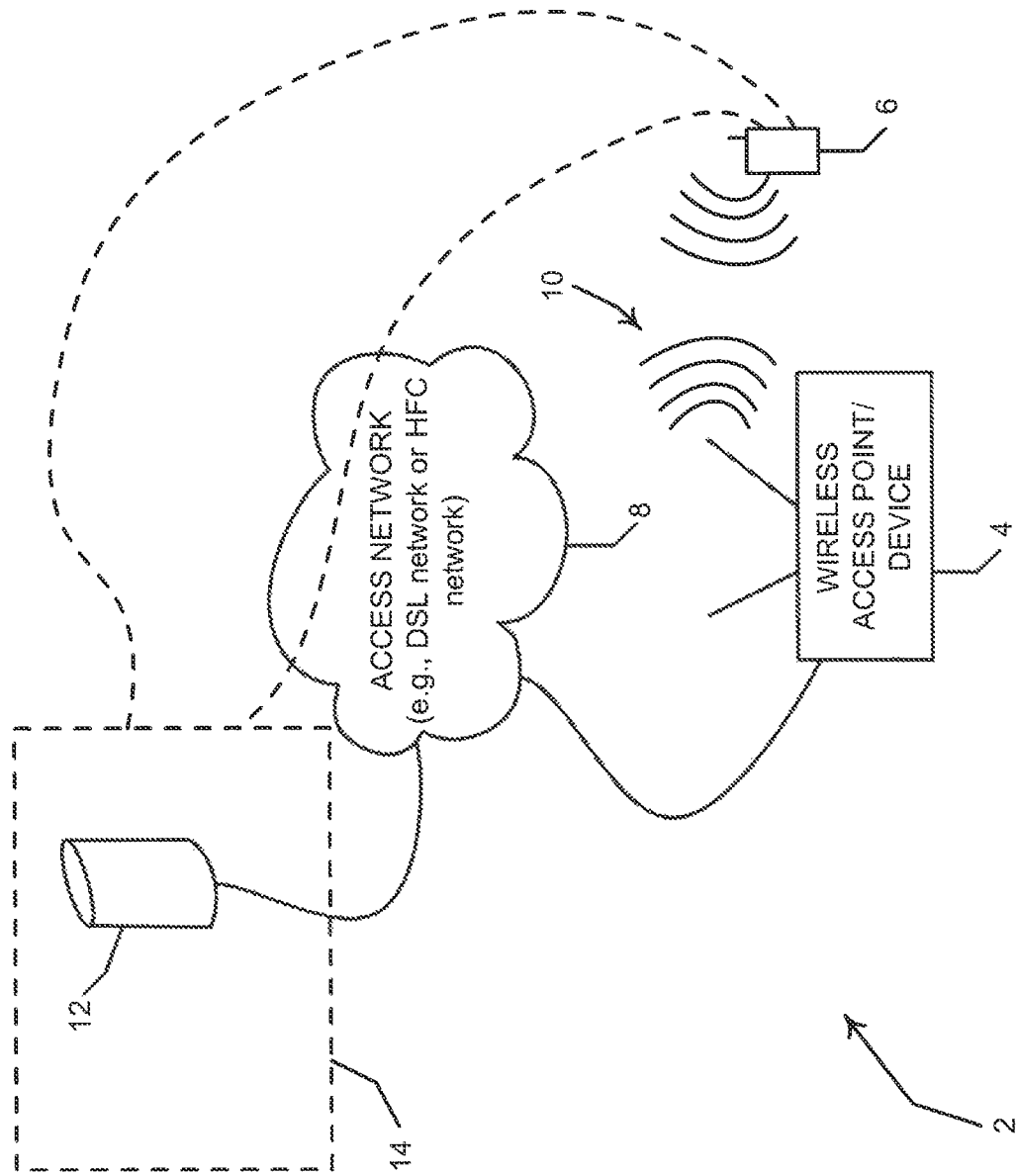
FIG. 1 illustrates an architecture for implementing a system for automatically configuring a mobile device for communication over a wireless access point coupled to a communication network.

Turning now to the figures, FIG. 1 illustrates an architecture for implementing a system 2 for automatically configuring a wireless access point 4 to process calls and other communications from a mobile user device 6 over a communication network 8, such as, for examples, a DSL network or an HFC network. When a subscriber mobile device enters the presence 10 of a wireless access point device 4, such as a DSL or cable modem with wireless capabilities, the mobile wireless device 6 typically receives a message periodically broadcast from access point 8. The broadcast message typically contains the network identifier corresponding to a device that has been configured to access the communication network via the access point device 4. This is a network identifier that has been previously generated and stored to configuration file server 12. Access point 4 obtains the network identifier and a corresponding access/encryption key either when it boots up or during operation and then stores it to non volatile memory coupled thereto. In addition to the network identifier associated in configuration file server 12 with devices that are authorized to access the communication network 8 via access point device 4, the broadcast message also typically includes unencrypted information. The information can be anything, and may be a randomly generated value. Upon receiving the broadcast message, subscriber mobile device 6 encrypts the unencrypted original information contained in the broadcast message broadcast from access point device 4, and sends a return message to the access point device in response to the broadcast message. The return message includes the network identifier and an encrypted version of the original information received in the broadcast message.

Network access point device 4 decrypts the encrypted portion of the return message and compares it to the original information that was sent unencrypted in the broadcast message. If the information decrypted from the return message matches the information it sent in the broadcast message, then the network access point device 4 grants the subscriber user device 6 access to network 8.

Creation, or generation, of the network identifier, for example an SSID, and the corresponding access/encryption key may occur when a subscriber first purchases subscriber mobile device 6, or when they switch service to the operator of network 8 using an existing mobile device. Sales personnel may scan a bar code on the device or its packaging that contains a unique identifier of device 6, or may manually input the unique identifier into an interface on a computer. The computer, coupled to network 8, may generate the SSID and associated encryption key and store them as values to a database, or configuration file, on server 12. The generation of the SSID and associated key could also be performed remotely directly from device 6 over, for example, a cellular network to which it is already authorized to use, or from a computer coupled to network 8. These scenarios are illustrated using broken lines between device 6 and head end 14 to illustrate possible means and methods for creating the configuration file record at server 12 that corresponds to the user device 6. In addition, it will be appreciated that server 12 may be located at an operator's head end 14, but may also be located outside the head end. Thus, head end 14 is also illustrated with broken lines.

Figure 2:
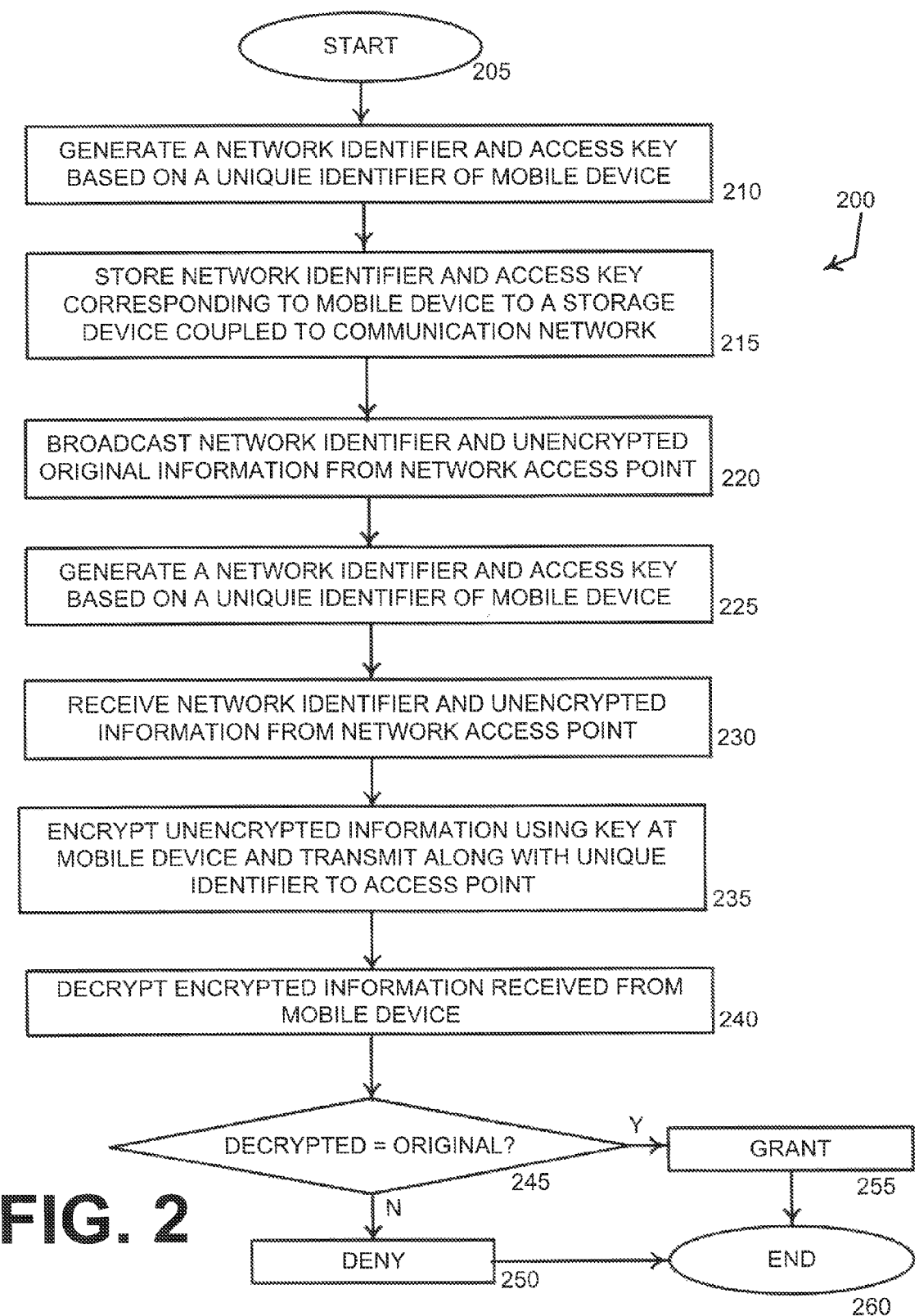
FIG. 2 illustrates a flow diagram of a method for operating a system for facilitating automatic configuration of a mobile user device for operation with a wireless communication network.

Turning now to FIG. 2, the figure illustrates a flow diagram of a method 200 for automatically performing configuration of a mobile user device so that its user does not have to perform the configuration manually. Method 200 begins at step 210 when a unique identifier of a mobile user device is stored to a database and used to generate a network identifier and access key. The device identifier (may also be referred to as subscriber identifier) can be based on an Electronic Serial Number if the device uses code division multiple access ("CDMA") or International Mobile Subscriber identities if communicating using GSM networks, for examples.

The network identifier corresponds to the network and service that a subscriber desires, and the key is used to encrypt information sent from the mobile device and to decrypt information received from an access point to the network. The generation of the network identifier and the unique access key may be performed according to an algorithm, such as a hash function, for example, or other similar algorithm known in the art. It will be appreciated that the network identifier and the key may also be generated using separate algorithms. The network identifier may be an SSID.

At step 215, the network identifier and the access key are stored to a device coupled to the network to be accessed. For example, an embedded media terminal adaptor ("EMTA") may be used to generate the network identifier and the key and to store them locally. The process of generating the network identifier and the key may be initiated according to various means and methods as determined by the operator of the network. For example, when a user buys a cellular phone, the retailer could push the unique identifier of the mobile device to the EMTA. Or, another device coupled to the network to be accessed could generated the network identifier and the corresponding key and push these values from a configuration database to the EMTA. Alternatively, the retailer could allow access at the EMTA to the mobile device's identifier by accessing the subscriber's broadband account via the EMTA.

At step 220, a network access point, for example a Wi-Fi transmitter coupled to the EMTA, broadcasts periodic messages that include the network identifier and some unencrypted original information. At step 225, the mobile user device uses its unique identifier to generate a network identifier and access key according to the same algorithm/hash function(s) that was/were used at step 210. It will be appreciated that the mobile user device may perform step 225 at boot up, or when network access is attempted, and may not necessarily be performed immediately after step 220 or immediately before step 230. Thus, it will be appreciated that at some point both the mobile user device and the access point either generate or obtain the same network identifier and access key based on the mobile device's unique identifier.

At step 230, the mobile user device receives the broadcast message that was broadcast at step 220 and determines that the network identifier contained therein corresponds to a network identifier stored on the mobile device. Using the key generated at step 225, the mobile user device encrypts the original information contained in the broadcast message and sends the encrypted information and the network identifier back to the access point in a return message at step 235.

The access point device receives the return message and decrypts the encrypted information at step 240 using the key that was generated at step 210. The access point device determines at step 245 whether the decrypted information is the same as the original information that was sent in the broadcast message at step 220. If the decrypted information does not equal the original information, access by the mobile user device to the desired network is denied at step 250 and method 200 ends at step 260. If the decrypted information matches the original information, the access point grants the mobile user device access to the desired network at step 255 and method 200 ends at step 260.

What is claimed is:

1. A method for automatically configuring a mobile user device for operation over a communication network to be accessed, comprising:

generating a first network identifier and an access key based on a unique identifier of the mobile user device;

broadcasting the first network identifier and unencrypted original information in a broadcast message from an access point device coupled to the network to be accessed, the broadcasting being performed from the access point device operating independently of the mobile user device;

generating at the mobile user device a second network identifier and access key based on the unique identifier of the mobile user device;

receiving the broadcast message at the mobile user device;

encrypting the unencrypted original information at the mobile user device using the second access key;

transmitting the encrypted original information along with the first or second network identifier to the access point device in a return message;

decrypting the encrypted information contained in the return message using the access key;

comparing the decrypted information to the original information; and granting the mobile user device access to the communication network to be accessed;

wherein the decrypting, comparing and/or granting are performed remotely from the mobile user device at one or more of the access device, an access network device, a headend device, or combinations thereof.

2. The method of claim 1 wherein the first and second network identifiers comprise service set identifiers.

3. The method of claim 1 wherein the first network identifier and the access key are generated at a device coupled to the network to be accessed.

4. The method of claim 3 wherein the first network identifier and the access key are pushed across the network to be accessed to the access point device.

5. The method of claim 1 wherein the mobile user device initiates the generating of the second network identifier and the access key over a wireless network to which it can access, wherein the wireless network is coupled with the communication network to be accessed.

6. The method of claim 1, further comprising using the second network identifier to identify the broadcast message by identifying a match between a service set identifier included in the broadcast message and the second network identifier.

7. The method of claim 6, wherein the service set identifier included in the broadcast message comprises the first network identifier.

8. The method of claim 1, wherein the method is operable to authenticate the mobile user device based on the mobile user device independently generating the second network identifier which matches the first network identifier used as a service set identifier for the broadcast message and use of the access key to encrypt the unencrypted original information.

\* \* \* \* \*